United States Patent [19]

Okamoto et al.

[11] Patent Number: 4,853,748

[45] Date of Patent: Aug. 1, 1989

[54] VARIABLE MAGNIFICATION COPIER

[75] Inventors: Yuji Okamoto; Shigeharu Maehara, both of Nara; Katsuyoshi Fujiwara, Osaka, all of Japan

[73] Assignee: Sharp Kabushiki Kaisha, Osaka, Japan

[21] Appl. No.: 217,051

[22] Filed: Jul. 7, 1988

Related U.S. Application Data

[63] Continuation of Ser. No. 38,193, Apr. 14, 1987, abandoned.

[30] Foreign Application Priority Data

Apr. 17, 1986 [JP] Japan ................................ 61-89773

[51] Int. Cl.[4] ................................ G03B 27/52

[52] U.S. Cl. ................................ 355/55

[58] Field of Search ................................ 355/7, 55, 3 SH

[56] References Cited

U.S. PATENT DOCUMENTS 4,350,439 9/1982 Tanioka et al. .................... 355/7 X 4,611,909 9/1986 Ogura et al. .................... 355/55 X 4,696,563 9/1987 Shibusawa .................... 355/3 SH X

FOREIGN PATENT DOCUMENTS 207152 10/1985 Japan .................................... 355/55

*Primary Examiner*—Donald A. Griffin

*Attorney, Agent, or Firm*—Flehr, Hohbach, Test, Albritton & Herbert

[57] ABSTRACT

With a variable magnification copier of this invention, not only magnification but a reference position in the direction of scan is specified such that the image formed on a copy paper sheet is not automatically enlarged with respect to the front edge of the original document to be copied. The difference between the time to start a scan and the time to feed copy paper is controlled such that the enlarged image will not stick out of the paper.

3 Claims, 7 Drawing Sheets

VARIABLE MAGNIFICATION COPIER

This is a continuation of application Ser. NO. 038,193, filed Apr. 14, 1987, and now abandoned.

BACKGROUND OF THE INVENTION

This invention relates to a copier with variable magnification means and more particularly to a copier with which the user can set a reference position such that an image can be formed with magnification varied with respect to this reference position. In other words, a copier of the present invention allows the user, after an original document to be copied is placed on its document table, to specify a position in the direction of the scan or a position on the document with respect to which enlargement or reduction is to be effected.

Variable magnification copiers have been in use but if use is made of a copy paper sheet of the same size as the original document to make an enlarged copy with a prior art copier, a back portion (with respect to the direction of scan) of the image sticks out of the paper and is not copied. This is illustrated in FIGS. 8(A) and 8() by way of an example wherein it is desired to obtain an enlarged copy of a portion (indicated by a shaded rectangular area) of a document with its front edge at distance l from the front edge of the document as shown in FIG. 8(A). If this area of interest is sufficiently near the back edge of the document and if the desired magnification M is sufficiently large, the enlarged image of the area of interest (indicated by a large shaded rectangle) may partially stick out of the normally placed copy paper which is assumed in this example to be of the same size as the original document as shown in FIG. 8(B). This occurs because the front edge of the document is treated as the reference position for the magnification such that the front edge of the image of interest is at the distance of lM from the front edge of the copy paper sheet. With a prior art copier, therefore, it is necessary to place the original document somewhere away from the normal document position on the document table. Similarly, if a copy paper sheet of the same size as the original document is used with such a prior art copier to obtain a copy reduced in size, the image of an area of interest is formed near the front edge of the copy paper sheet. This is again because the reference position for reduction is at the front edge of the document. If it is desired to leave some space along an edge of the copy paper, for example, for the purpose of binding, the original document again must be placed somewhere away from the normal document position.

SUMMARY OF THE INVENTION

It is therefore an object of the present invention to provide a copier with which an enlarged or reduced copy of specified magnification can be obtained with a position specified by the user serving as the reference position of enlargement or reduction.

A copier with which the above and other objects of the present invention are achieved is provided not only with an optical unit or a document scanning means including a document table and an image position controlling means for controlling the position of the image with respect to the copy paper sheet by the difference between the time when the scanning starts and the time when the feeding of the copy paper sheet starts such that an enlarged or reduced image is obtained with respect to a specified reference position, but also a means for setting a distance between the front edge of the original document and the aforementioned reference position. With a copier thus comprised, the time difference between the beginning of a scan and the feeding of copy paper sheet can be controlled by the timing according to which an image is obtained on the copy paper at the set reference position. Accordingly, the original document need not be moved away from the normal document position.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Figure 1A:
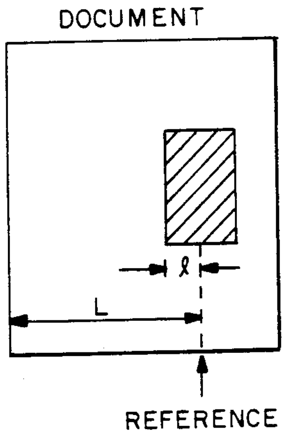
FIGS. 1(A) and 1(B) are drawings showing the positional relationship of an original document and an enlarged image thereof on a copy paper sheet when a copier embodying the present invention is used.
Figure 1B:
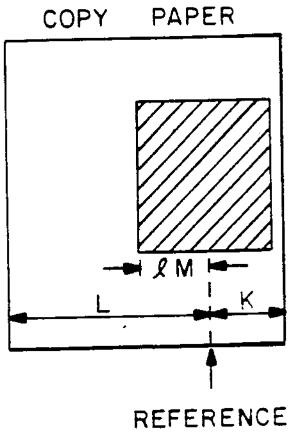

Positional relationship between a document to be copied and an enlarged copy thereof obtained on a copy paper sheet by a copier of the present invention is illustrated by FIG. 1(A) which shows the document and FIG. 1(B) which shows the copy paper of the same size as the document. The shaded area in FIG. 1(A) represents an area of interest and only this area is selectively copied on the paper by a process called "trimming". The distance between the front edge of the document (with reference to the direction of the scan) and the reference position is designated by L. As shown in FIG. 1(B), the image obtained on the copy paper is enlarged (magnification M) with respect to the reference position which is also at a distance L from the front edge of the copy paper sheet.

Figure 2A:
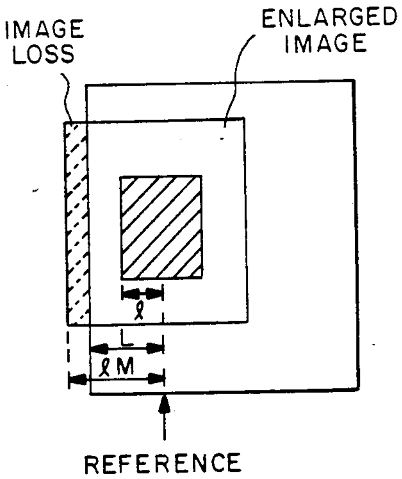
FIGS. 2A and 2B are drawings showing a situation where the reference position is shifted so as to avoid an image loss.
Figure 2B:
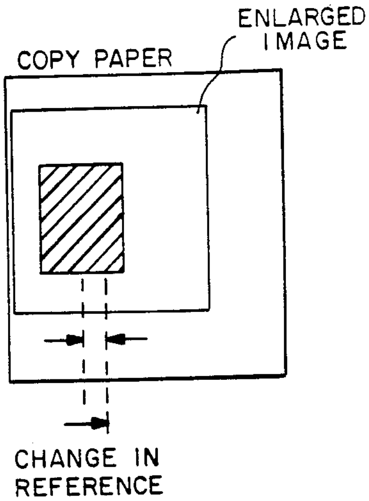

If l (=half width of the area of interest as shown in FIG. 1(A)), L and M are such that lM is greater than L as shown in FIG. 2(A), an image loss (that is, the position of the image which is not copied) occurs at the front of the trimming area. Such an image loss can be eliminated by shifting the reference position such that the forward edge of the copy paper sheet matches that of the trimming area as shown in FIG. 2(B). If lM is greater than K (the distance between the back edge and the reference position as shown in FIG. 1(B)), on the other hand, an image loss occurs along the back edge of the trimming area. In this situation, the reference position is shifted such that the back edges of the copy paper and the trimming area will match and the image loss is eliminated.

Figure 3:
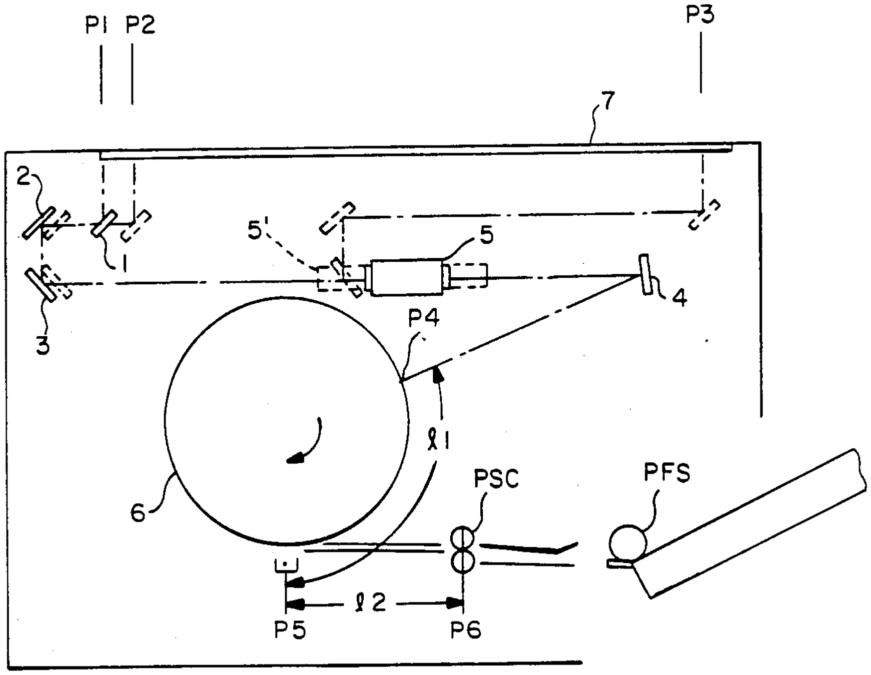
FIG. 3 is a schematic drawing for showing the structure of a copier of the present invention.

The structure of a copier embodying the present invention is explained briefly with reference to FIG. 3. An optical unit includes a first mirror 1, a second mirror 2 and a third mirror 3, and numeral 7 indicates a document table. Scanning of a document is effected by this optical unit which moves along the document table 7. Numerals 5 and 6 indicate a zoom lens and a photoreceptor drum, respectively. P1 through P6 respectively indicate the home position of the first mirror the front edge position of the document, the farthest position of the first mirror 1, the point of incidence of light on the photoreceptor drum 6, the image transfer position and the starting position of copy paper sheet before it is fed. PSC (paper start clutch) indicates the position where the copy paper stops before it is fed at a specified time.

With a copier thus structured, the position of an image on the copy paper can be varied by controlling the time difference between when the first mirror 1 reaches the point P2 and when the PSC is switched on. Since a distance L at the document table is enlarged to LM on the photoreceptor drum, the starting of the PSC should be delayed until after the first mirror 1 passes the position P2, to make up for an extra distance of L(M−1) on the photoreceptor drum. Likewise, if M is less than 1, or if an image smaller than the original is desired, the PSC should be started earlier corresponding to a distance of L(1−M) on the photoreceptor drum. In summary, if the distance between the two positions P4 and P5 along the surface of the photoreceptor drum and that between the two positions P5 and P6 are respectively $l_1$ and $l_2$ as shown in FIG. 3, the time difference which should be between when the first mirror 1 reaches the position P2 and when the PSC is started is given as a function of M by $$T_a=[L(M-1)+(l_1-l_2)]/V_0$$

where $V_0$ is the speed of the photoreceptor drum at its periphery.

In a situation shown by FIG. 2(A) where M is equal to or greater than 1 and lM is greater than L, the image loss at the front edge can be eliminated by starting the PSC after the first mirror 1 reaches the position P2 so as to create a difference in distance of M(L−l) on the photoreceptor drum. The delay with the distances $l_1$ and $l_2$ taken into consideration is given by $$T_c=[M(L-l)+(l_1-l_2)]/V_0$$

In a situation shown by FIG. 1(B) where M is equal to or greater than 1 and lM is greater than K, the image loss can be eliminated likewise by delaying the start of the PSC by $$T_b=[L(M-1)+(lM-K)+(l_1-l_2)]/V_0$$

In the case of M being less than 1, if $l_1-l_2$ is greater than L(1−M), the starting of the PSC should be delayed by $$T_d=[(l_1-l_2)-L(1-M)]/V_0$$

and if $l_1-l_2$ is equal to or less than L(1−M), the PSC must be started earlier by $$T_e=[L(1-M)-(l_1-l_2)]/V_0.$$

In situations where the PSC is switched on before the first mirror 1 reaches the position P2, the timing must be further adjusted according to the acceleration characteristics between the positions P1 and P2 of the optical unit which includes the first mirror 1. A method of this adjustment will be described below.

Figure 4:
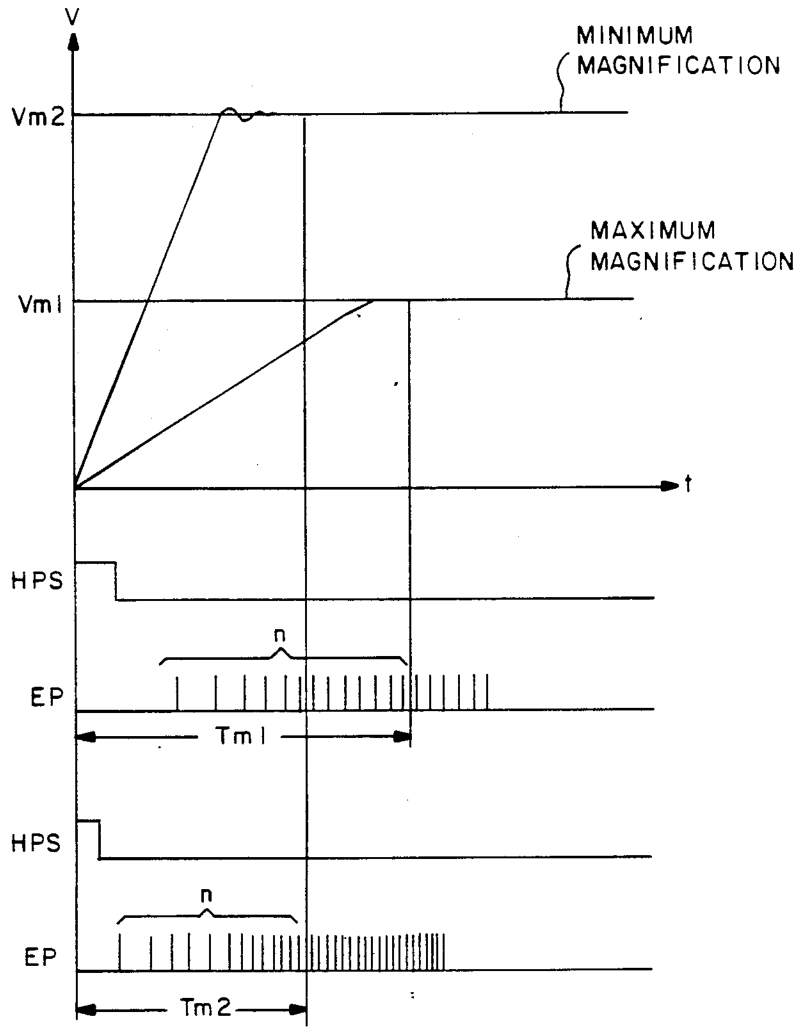
FIG. 4 is a drawing for showing a method of the present invention for determining the acceleration time of the optical system.
Figure 6:
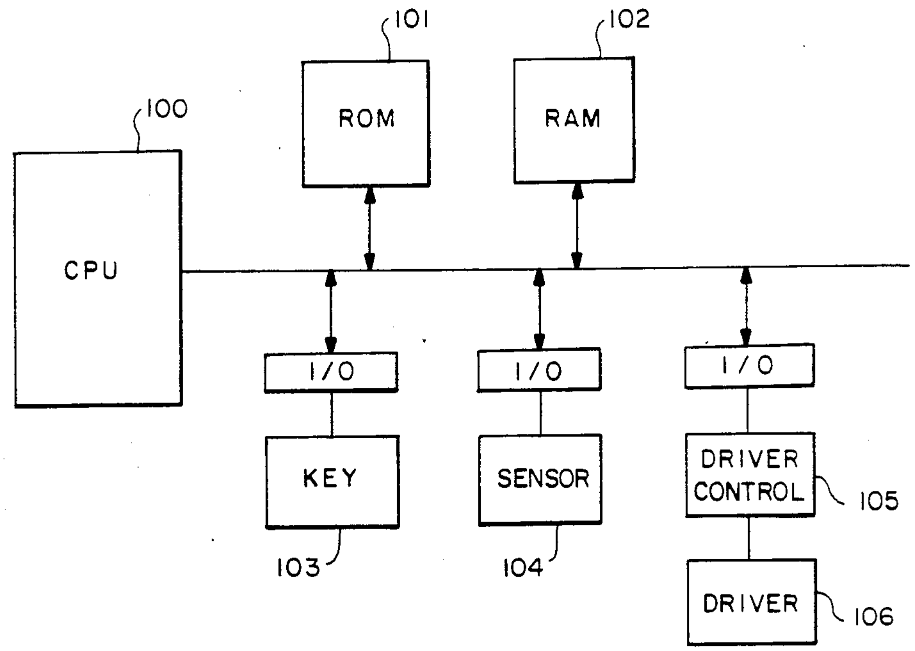
FIG. 6 is a block diagram of the control unit of the copier of FIG. 3, FIG. 7(A) to 7(C) are a flow chart of the operation of the control unit of FIG. 6, and FIGS. 8(A) and 8(B) are drawings showing the positional relationship of an original document and an enlarged image thereof on a copy paper sheet when a prior art copier is used.
Figure 8A:
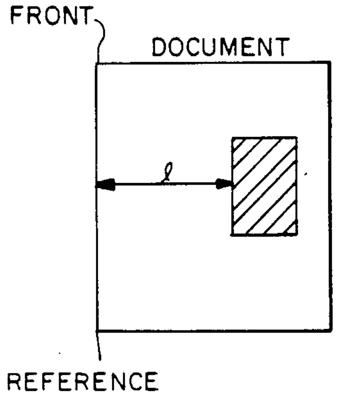
(PRIOR ART) FIG.-8A
Figure 8B:
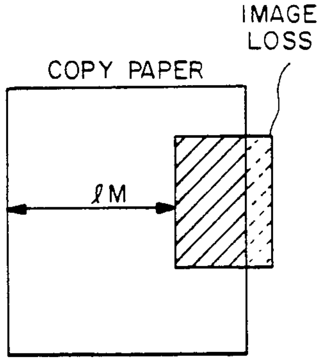
(PRIOR ART) FIG.-8B

With reference to FIG. 6 which is a block diagram of the control unit of a copier embodying the present invention, the overall control of the copier is effected by a CPU 100 according to a program stored in ROM 101. RAM 102 are used as working areas for temporarily storing flags and also as buffers and timers when this program is executed. Numeral 103 indicates a keyboard input device for specifying various conditions of operation, numeral 104 generally indicates sensors for detecting encoder pulses to be described below as well as the position of a copy paper sheet, and numeral 105 indicates a driver controller for controlling drivers 106 for operating the optical unit, a copy lamp (not shown in FIG. 3), the photoreceptor drum, etc. The acceleration characteristics of the optical unit are shown in FIG. 4 for representative situations where the optical system is set for the minimum and maximum magnifications. The scanning speed of the optical unit is designated therein by Vm1 and Vm2 respectively corresponding to the maximum and minimum magnifications. As can be seen clearly in FIG. 4, the acceleration characteristics of the optical unit are such that a steady scanning speed is reached sooner if the scanning speed is greater. In FIG. 4, HPS indicates a home position switch which is switched off when the optical unit passes the aforementioned home position P1 and EP indicates the encoder pulse, or the pulse detected by a rotary encoder (a rotary disk with a slit) of a known kind. After the optical unit is activated, the number of these pulses are counted for monitoring its position. For example, displacement of the optical unit from its home position P1 to the position P2 is detected by counting a predetermined number (n) of pulses. With reference still to FIG. 4, therefore, Tm1 represents the acceleration time (the time interval during which acceleration takes place) of the optical unit as it moves from P1 to P2 when the optical unit is set for the maximum magnification and Tm2 represents the same when it is set for the minimum magnification.

The acceleration time Tm at arbitrary magnification M=m can be obtained by the following formula:

$$Tm=Tm1+(Tm1-Tm2)\ (m-m1)/(m1-m2)$$

because acceleration time can be expressed as a linear function of magnification. Thus, for example, if the PSC is switched on after a time interval of $T_e$ as calculated above and the optical unit is started after another time interval of $T_m$, the acceleration time of the optical unit can be adjusted appropriately.

Figure 7A:
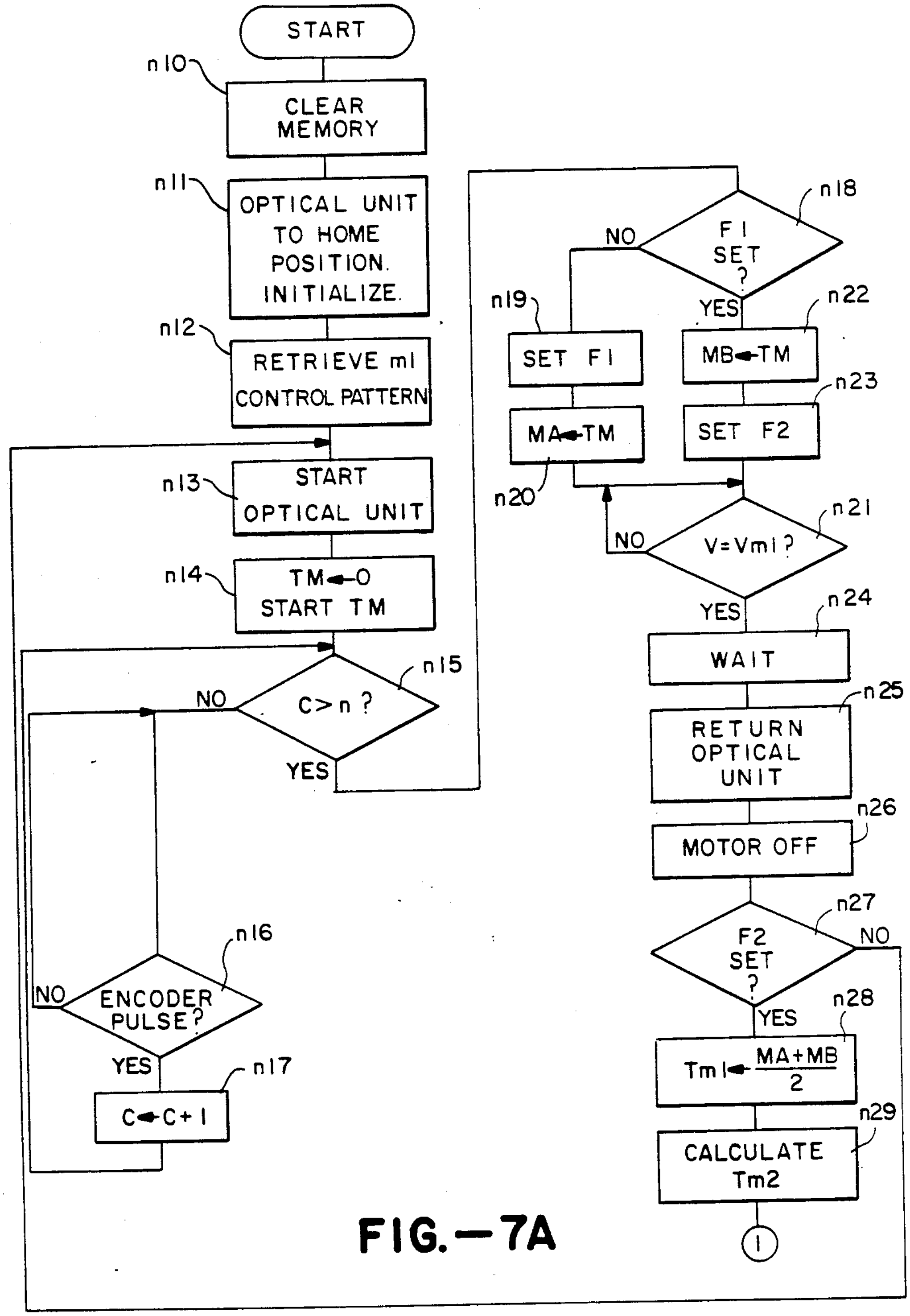
Figure 7B:
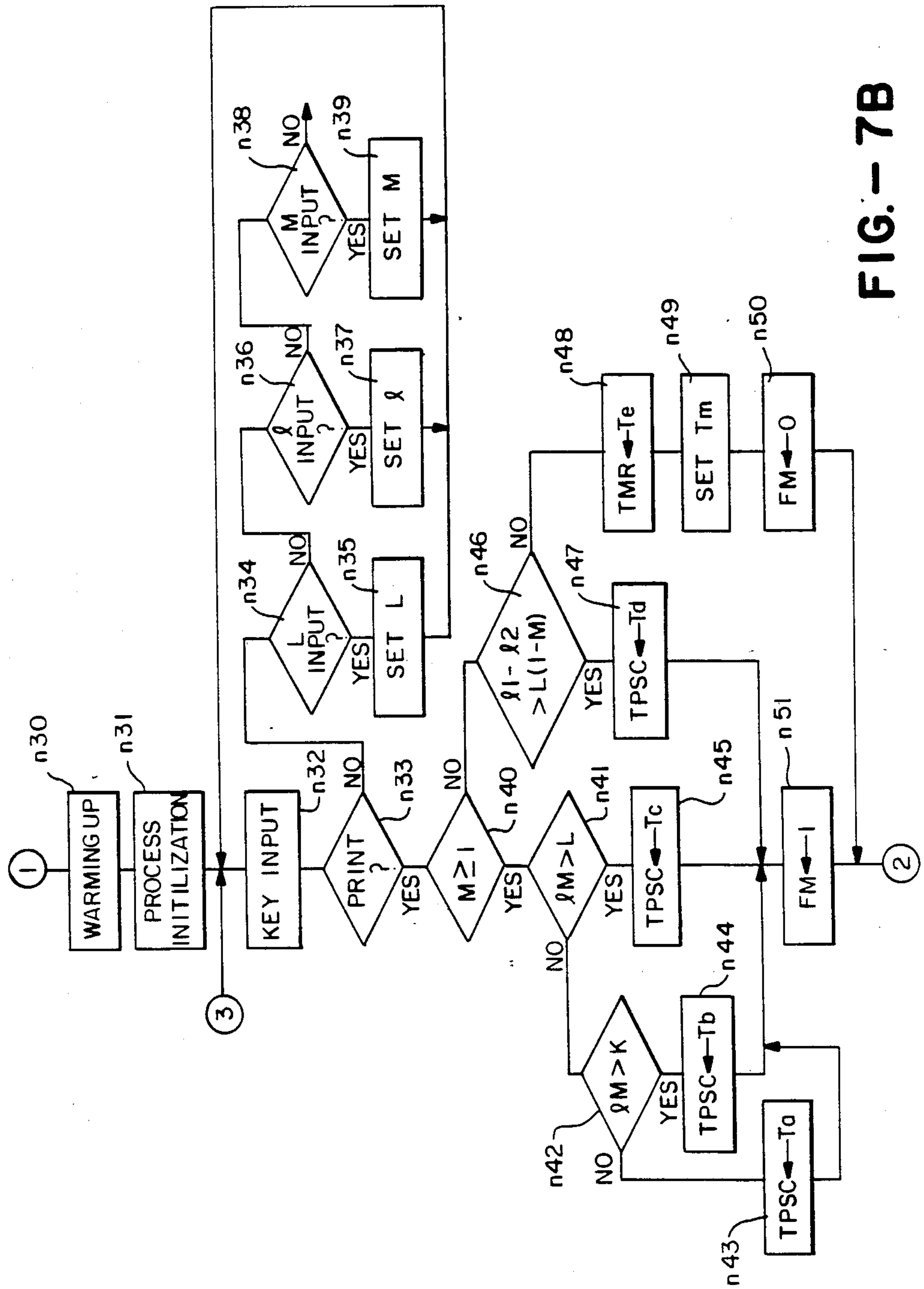
Figure 7C:
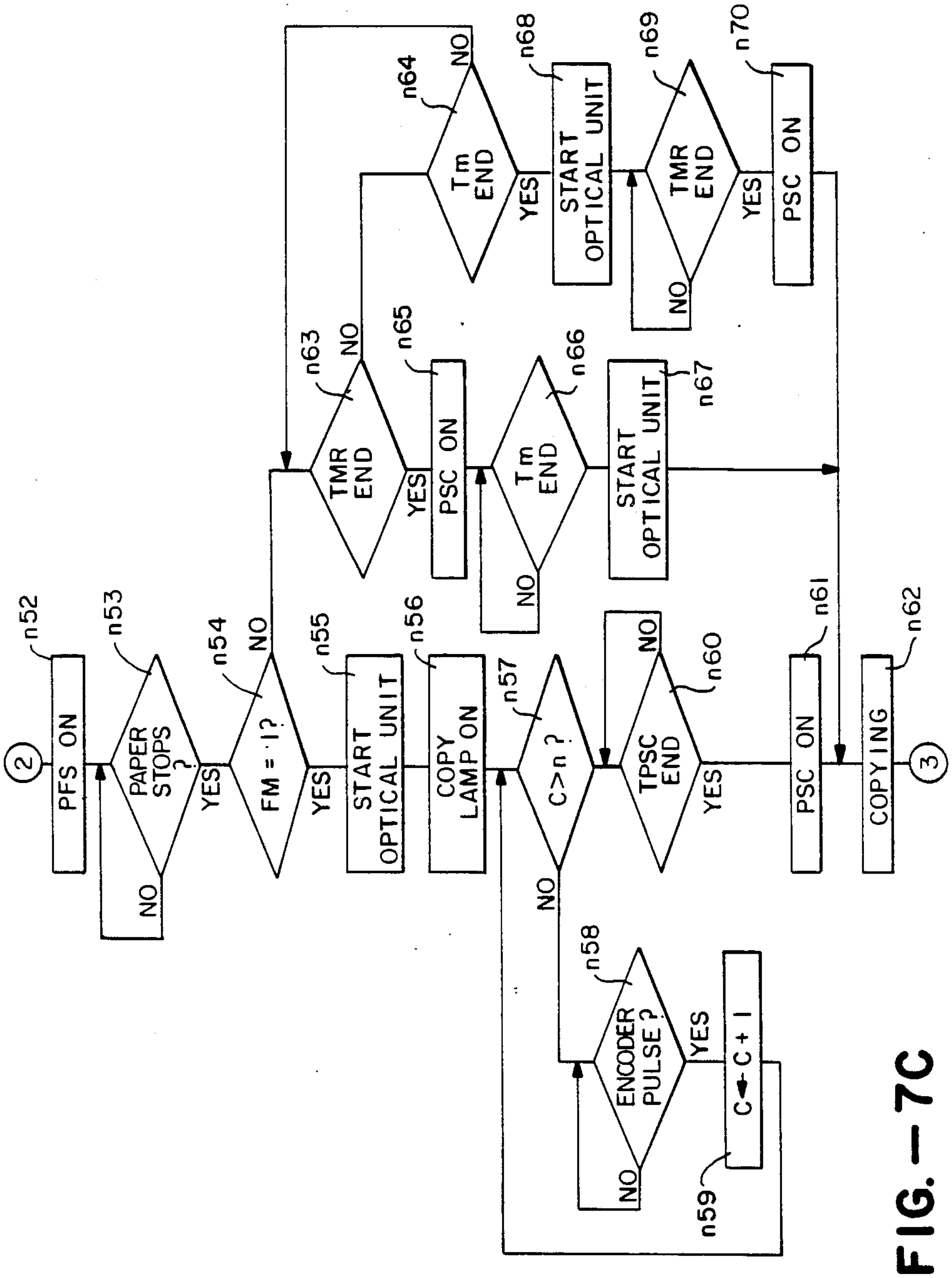

The control program for the operation described above is explained next by way of a flow chart shown in FIG. 7. The memory devices are cleared initially (n10) and as the optical unit is returned to the home position (n11), a counter C for indicating the position of the optical unit is initialized. Thereafter, the control pattern corresponding to magnification $M_1$ is retrieved from the memory (n12). By the "control pattern" is generally meant a collection of prerecorded data corresponding to a given magnification and the original document to be copied is scanned according to these data. Thus, the motor for driving the optical unit is switched on (n13) and a timer TM is reset and started (n14). Thereafter, the system waits until the counter C counts n pulses to indicate that the optical unit has come to the position P2. This is done, as explained above, by adding 1 to the counter C (n17) every time an encoder pulse is detected (n16).

After the counter C has counted n encoder pulses (YES in n15), a first flag F1 is examined (n18). Since all flags are reset in the beginning, the system goes to Step n19 where the flag F1 is set and the time TM taken by the system in coming out of the loop from n15 to n17 and back to n15 is stored in a memory area MA (n20). This time value TM corresponds to Tm1 shown in FIG. 4. Thereafter, if it is ascertained that the optical unit has reached a uniform speed (YES in n21), the system waits for a predetermined length of time until the driving means for the optical unit stabilizes (n24) and then the motor for the optical unit is switched off (n26) after the optical unit is returned to its home position (n25).

A second flag F2 is examined next (n27) but since it is reset at this stage, the system returns to Step n13. Steps n15 through n18 are repeated but since the first flag F1 is set this time (YES in n18), the system proceeds to Step n22 where the timer value TM is stored in another memory area MB, and the second flag F2 is set (n23). If the set condition of this flag F2 is recognized in Step n27, the average of the values stored in areas MA and MB is obtained and saved as Tm1 (n28) indicative of the average acceleration time of the scanning corresponding to magnification $m_1$. Thereafter, a similar calculation is repeated with magnification $m_2$ to obtain the average acceleration time corresponding to magnification $m_2$ (n29).

Various components of the copier such as the fixing device (not shown) are warmed up (n30) and initialized (n31). Input data from the keyboard 103 are accepted thereafter (n32) and copying is effected according to the data thus received. The keyboard 103 typically includes keys for setting distances L and l as defined with reference to FIGS. 1(A) and 1(B) as well as magnification M. Values of these parameters are set by operating these keys (n35–n39). If a print key (not shown) is operated after these values are set (YES in n33), the time difference between when the optical unit is started and when the PSC is switched on is calculated according to the conditions thus set. If M is greater than or equal to 1 (YES in n40) and lM is equal to or less than L (NO in n41) and equal to or less than K (NO in n42), for example, $T_a$ is set in a timer TPSC (n43) and a flag FM is set (n51) to indicate that the operation is in a mode wherein the PSC is switched off after the optical unit is started. If M is less than 1 (NO in n40) and $l_1-l_2$ is equal to or less than L(1−M) (NO in n46), as another example, $T_e$ is set in another timer TMR (n48), a value Tm indicative of the timing for starting the optical unit is calculated from the input value of M and set (n49) and the aforementioned F lag FM is reset (n50).

Subsequently, a paper feed solenoid (PFS) is switched on (n52) and if the flag FM is set (YES in n54) when the paper stops at the position of the PSC (n53), the optical unit is started (n55) and the copy lamp is turned on (n56). The copier then waits until the optical unit reaches the position P2 shown in FIG. 3. This is accomplished, as explained above in connection with FIG. 4, by counting a predetermined number (n) of aforementioned encoder pulses (n57, n58 and n59). When it is determined that the optical unit has reached the position P2 (YES in n57), the copier waits for a time period calculated and stored in the timer TPSC (n60) and then turns on the PSC (n61). An image can be thus obtained at the desired position on the copy paper by switching on the PSC after waiting for a set period of time.

If the flag FM is reset (NO in n54), the PSC is switched on (n65 or n70) after a predetermined period TMR (YES in n63 or n69) and the optical unit is started (n67 or n68) after another predetermined time period $T_m$ (YES in n64 or n66). In this situation, both timers TMR and TM are started simultaneously to control the PSC and the optical unit.

Figure 5:
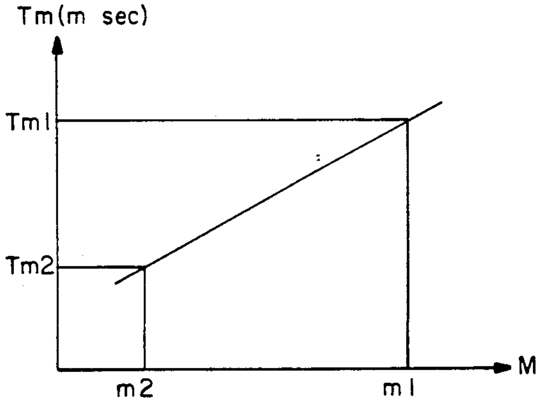
FIG. 5 is a graph showing the relationship between magnification and acceleration time of the optical unit.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, $m_1$ and $m_2$ in FIGS. 4 and 5 need not be the maximum and minimum magnifications because the relationship between magnification and acceleration time is linear and the equation for the straight line shown in FIG. 5 can be determined by selecting any two magnifications and by proceeding similarly as described above. FIG. 3 disclosed a copier of the type with an optical unit which moves with respect to the original document to be copied which remains stationary during a scanning operation but the present invention is applicable also to a copier of the type with a fixed optical unit with respect to which original documents to be copied are moved. Any such modifications and variations that may be apparent to a person skilled in the art are intended to be included within the scope of this invention.

What is claimed is:

1. A variable magnification copier comprising a scanning means for performing an optical scan of an original document and forming on a photoreceptor an image of said original document, input means for inputting a reference position indicating the position of a target image on said original document, a length value indicating the extension of said target image on said original document in the direction of said scan and a magnification value at which said target image is to be enlarged or contracted by said copier, paper transporting means for delivering a copy paper sheet to an image transfer position, image transfer means for transferring an image from said photoreceptor to a copy paper sheet at said image transfer position, control means for automatically controlling the timing by which said paper transporting means delivers a copy paper sheet to said image transfer position with respect to the timing at which said scan is performed according to said reference position, said length value and said magnification value inputted through said input means such that an image of said target image formed on a copy paper sheet delivered by said paper transporting means at a magnification indicated by said magnification value inputted through said input means is not lost at all from said copy paper sheet.

2. The copier of claim 1 wherein said control means comprises a central processing unit.

3. The copier of claim 1 wherein said control means also serves to establish a functional relationship between a magnification value inputted through said input means and a time length during which said scanning means accelerates in said scan.

* * * * *